UNITED STATES PATENT OFFICE 2,516,971

CHLOROETHYLATION OF ALKYLATED BENZENE COMPOUNDS

Eugen Gottfried Galitzenstein, London, Francis Edward Salt, Banstead, Herbert Muggleton Stanley, Tadworth, and Thomas Weir, Epsom, England, assignors to The Distillers Company, Limited, Edinburgh, Scotland, a British company No Drawing. Application October 17, 1946, Serial No. 703,706. In Great Britain October 22, 1946

7 Claims. (Cl. 260—651)

This invention relates to an improved process for the manufacture of alpha-chloroethyl alkyl benzenes, by the chloroethylation of polymethyl-substituted benzenes, such as m-xylene, pseudo cumene and mesitylene.

It is known that alpha-chloroethyl-xylene can be prepared by reacting m-xylene with paraldehyde and aqueous hydrochloric acid in the presence of a low boiling diluent or solvent such as petroleum ether, but in the absence of any metal salts acting as condensing agents. The yields of alpha-chloroethyl xylene obtained by this process, however, are very unsatisfactory.

According to the present invention there is provided a process for the manufacture of chloroethyl-alkyl benzenes which comprises condensing di(alpha-chloroethyl) ether with a polymethyl-substituted benzene in the presence of zinc chloride at a temperature between −15° C. and +15° C. the reaction mixture being adjusted to contain not more than 50% by weight of water calculated upon the weight of zinc chloride used. The reaction is facilitated by the presence of hydrogen chloride which may be dissolved in the polymethyl benzene or passed into the reaction mixture.

The di(alpha-chloroethyl) ether may be prepared in situ by the interaction of hydrogen chloride with acetaldehyde or substances decomposable, under the reaction conditions, to yield acetaldehyde, for example, by passing a current of gaseous hydrogen chloride into a liquid mixture comprising the polymethyl-substituted benzene and acetaldehyde, in the presence of zinc chloride, as condensing agent, whilst maintaining the reaction mixture at a temperature between −15° C. and +15° C. and limiting the water content thereof as above stated. In this reaction, apparently, the formation of di(alpha-chloroethyl) ether first takes place according to the equation $2CH_3.CHO + 2HCl = (CH_3CHCl)_2O + H_2O$ and the ether thus formed then condenses, under the influence of the zinc chloride, with the polymethyl-benzene.

The optimum reaction temperature may vary slightly with the methylated benzene to be chloroethylated. Thus, for instance, the chloroethylation of m-xylene is best carried out at 0° C., whilst a temperature of +10° C. is found to be most advantageous for the chloroethylation of mesitylene. The reaction with p-xylene results in very small yields only.

Instead of acetaldehyde, substances such as paraldehyde, which decompose to yield acetaldehyde under the reaction conditions may be used.

We have observed that the presence of water will decrease the rate of substitution and will even inhibit the reaction when the quantity exceeds 50% by weight of the zinc chloride used. As water is formed during the reaction, we have found it advantageous to restrict the amount of water initially present by excluding water from the reaction mixture at the start and adding the zinc chloride in the anhydrous state—preferably in finely divided form, or as an aqueous solution which does not contain more than 25% by weight of water. The hydrogen chloride used is preferably free from moisture.

The following example illustrates the manner in which the invention may be carried into effect:

*Example I.*—212 g. of pure m-xylene were mixed with 30 g. of powdered anhydrous zinc chloride, cooled to about 0° C. and saturated with dry hydrogen chloride with vigorous agitation. 44 g. of paraldehyde were slowly added to the cooled agitated reaction mixture over a period of half an hour. Stirring was continued for a further 3½ hours, the temperature being maintained at about 0° C. A slow stream of dry hydrogen chloride was passed in during the addition of the paraldehyde. The reaction product separated into two layers and the lower aqueous layer containing zinc chloride was separated, while the upper layer was washed with ice-water until it was free from hydrochloric acid and zinc salt. It was then dried and fractionally distilled in vacuo. The yield of distilled alpha-chloroethyl m-xylene amounted to 71.3% of the theoretical based on the paraldehyde used.

Instead of using pure m-xylene as raw material, a commercial mixture which is substantially free from unsaturated compounds, such as is known under the trade name "Chemists' Xylene" and containing about 65% by weight of m-xylene, may be used.

*Example II.*—A mixture of 480 g. of isomeric trimethylbenzenes (containing mesitylene and pseudo-cumene) with 30 g. of powdered anhydrous zinc chloride was reacted with 44 g. of paraldehyde in the manner described in Example I, but maintaining the temperature of the mixture at about 10° C. The yield of alpha-chloroethyl trimethylbenzenes amounted to 71.5% of the theoretical based on the paraldehyde employed.

An alternative way to that described above of carrying the invention into effect consists in first preparing the di(alpha-chloroethyl) ether, separating it from the water formed in that reaction and then proceeding with the condensation reaction in the presence of zinc chloride. To carry out this process acetaldehyde, or substances decomposable, under the reaction conditions, to yield acetaldehyde, is dissolved in the polymethyl-substituted benzene and then hydrogen chloride is passed through the reaction mixture which is maintained at the stated low temperature. When the reaction mixture is saturated with hydrogen chloride and the acetaldehyde has been converted into the chlorine-substituted ether, the water formed separates in the form of an aqueous layer which is removed, for instance, by decantation. By bringing the remaining mixture, whilst keeping it at the stated low temperatures, in contact with zinc chloride, the condensation between the chlorinated ether and the polymethyl-substituted benzene is effected and the following examples illustrate this alternative method:

*Example III.*—A mixture of 39.6 g. of paraldehyde in 170 cc. of commercial xylene free from unsaturated compounds (Chemists' Xylene) was saturated with dry hydrogen chloride at about 0° C. whilst stirring. The mixture formed two layers; the lower aqueous layer was separated and the upper layer containing the di(alpha-chloroethyl) ether was slowly added over a period of 55 minutes to a cooled agitated mixture of 20 g. of pure zinc chloride suspended in 200 cc. of xylene which had previously been saturated with hydrogen chloride. After a further period of three hours, during which the reaction mixture was stirred and maintained at about 0° C. the reaction product was worked up as described in Example I. The yield of distilled alpha-chloroethyl xylene amounted to 69% of the theoretical based on the paraldehyde used.

*Example IV.*—A solution of the di(alpha-chloroethyl) ether in xylene was prepared as described in Example III. 270 g. of this solution were slowly added during a period of 45 minutes to 106 g. of xylene to which 37.5 g. of a mixture of zinc chloride and water, in the proportion of 80 parts by weight of the former to 20 parts by weight of water, have been added. The mixture was agitated for a further 2¼ hours, the temperature throughout being maintained at about 0° C. The resulting reaction product was worked up as described in Example I. The yield of distilled alpha-chloroethyl xylene was 64% of the theoretical based on the paraldehyde used.

By carrying out the chloroethylation process according to this invention, the formation of resinous matter as well as of diaryl ethane compounds in any considerable quantity is avoided and good yields of the chloroethylated aryl compounds are obtained.

The chloroethyl-substituted polymethyl benzenes may be converted by elimination of hydrogen chloride, in any well-known manner, into valuable nuclear methyl-substituted styrene compounds.

A process for the separation of ethylbenzene from, or its concentration in, hydrocarbon mixtures containing isomeric xylenes employing the herein described chloroethylation process is described in copending British application No. 27708/45 of even date herewith.

The expression "compound yielding acetaldehyde" as employed in the appended claims is intended to designate acetaldehyde, paraldehyde and compounds decomposable under the reaction conditions to yield acetaldehyde.

What we claim is:

1. A process for the manufacture of chloroethyl-alkyl benzenes which comprises condensing di(alpha-chloroethyl) ether with a polymethyl-substituted benzene in the presence of zinc chloride at a temperature between −15° C. and +15° C. the reaction mixture being adjusted to contain not more than 50% by weight of water calculated upon the weight of zinc chloride used.

2. A process according to claim 1 wherein a stream of hydrogen chloride is passed into the reaction mixture.

3. A process for the manufacture of chloroethyl-alkyl benzenes which comprises condensing di(alpha-chloroethyl) ether with a xylene in the presence of zinc chloride at a temperature between −15° C. and +15° C. the reaction mixture being adjusted to contain not more than 50% by weight of water calculated upon the weight of zinc chloride used.

4. A process for the manufacture of chloroethyl-alkyl benzenes which comprises condensing di(alpha-chloroethyl) ether with m-xylene in the presence of zinc chloride at a temperature of about 0° C. the reaction mixture being adjusted to contain not more than 50% by weight of water calculated upon the weight of zinc chloride used.

5. A process for the manufacture of chloroethyl-alkyl benzenes which comprises condensing di(alpha-chloroethyl) ether with mesitylene in the presence of zinc chloride at a temperature of about +10° C. the reaction mixture being adjusted to contain not more than 50% by weight of water calculated upon the weight of zinc chloride used.

6. A process according to claim 4 in which the di(alpha-chloroethyl) ether is produced by passing a current of gaseous hydrogen chloride through a liquid mixture of m-xylene and a compound yielding acetaldehyde, and then bringing the reaction mixture into contact with zinc chloride to effect condensation of the di(alpha-chloroethyl) ether and m-xylene.

7. A process in accordance with claim 4 in which the di(alpha-chloroethyl) ether is produced by passing a current of gaseous hydrogen chloride through a liquid mixture of m-xylene and a compound yielding acetaldehyde, separating the aqueous layer formed upon conversion of the acetaldehyde into di(alpha-chloroethyl) ether, and bringing the resulting reaction mixture containing said ether into contact with zinc chloride to effect the condensation of said ether and said m-xylene.

EUGEN GOTTFRIED GALITZENSTEIN.
FRANCIS EDWARD SALT.
HERBERT MUGGLETON STANLEY.
THOMAS WEIR.

REFERENCES CITED

The following references are of record in the file of this patent:

UNITED STATES PATENTS

| Number | Name | Date |
|---|---|---|
| 1,926,314 | Smith | Sept. 12, 1933 |
| 2,219,873 | Pinkernelle | Oct. 29, 1940 |

OTHER REFERENCES

Adams et al.: "Organic Reactions," vol. 1, pages 66–73 (1942).

Stephens et al.: "Jour. Chem. Soc." (London), 1920, pages 515–519.